United States Patent
Siddiqui

(10) Patent No.: US 9,940,756 B2
(45) Date of Patent: *Apr. 10, 2018

(54) SILHOUETTE-BASED OBJECT AND TEXTURE ALIGNMENT, SYSTEMS AND METHODS

(71) Applicant: Nant Holdings IP, LLC, Culver City, CA (US)

(72) Inventor: Matheen Siddiqui, Culver City, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/642,276

(22) Filed: Jul. 5, 2017

(65) Prior Publication Data

US 2017/0301144 A1    Oct. 19, 2017

Related U.S. Application Data

(63) Continuation of application No. 15/285,389, filed on Oct. 4, 2016, now Pat. No. 9,728,012, which is a
(Continued)

(51) Int. Cl.
*G06T 7/00* (2017.01)
*G06T 19/00* (2011.01)
(Continued)

(52) U.S. Cl.
CPC ........ *G06T 19/006* (2013.01); *G06K 9/00208* (2013.01); *G06K 9/6255* (2013.01);
(Continued)

(58) Field of Classification Search
CPC ........... G06T 15/20; G06T 7/251; G06T 7/75; G06K 9/6255; G06K 9/00208
See application file for complete search history.

(56) References Cited

U.S. PATENT DOCUMENTS

| 6,711,293 B1 | 3/2004 | Lowe |
| 6,858,826 B2 | 2/2005 | Mueller et al. |

(Continued)

FOREIGN PATENT DOCUMENTS

| DE | 689 24 458 T2 | 6/1996 |
| WO | WO 2009/036831 A1 | 3/2009 |

OTHER PUBLICATIONS

Esteban, "Stereo and silhouette fusion for 3D object modeling from uncalibrated images under circular motion," Telecom ParisTech, May 1, 2004, 196 pages.
(Continued)

*Primary Examiner* — Feng Niu
*Assistant Examiner* — Mia M Thomas
(74) *Attorney, Agent, or Firm* — Mauriel Kapouytian Woods LLP; Andrew A. Noble; Michael Mauriel

(57) ABSTRACT

An object-image alignment data generating method for use in an object recognition system is presented. The method obtains a 3D model and a set of 2D images of the object. Each 2D image from the set is captured based on a particular camera point of view. The method then uses the 3D model of the object to generate multiple silhouettes of the object according to different camera point of views. Each silhouette is then matched and aligned with a 2D image based on the corresponding camera point of view. The method also derives at least one descriptor from the 2D images and compiles feature points that correspond to the descriptors. Each feature point includes a 2D location and a 3D location. The method then generates an object-image alignment packet by packaging the 2D images, the descriptors, and the feature points.

22 Claims, 4 Drawing Sheets

Related U.S. Application Data continuation of application No. 14/546,873, filed on Nov. 18, 2014, now Pat. No. 9,489,765.

(60) Provisional application No. 61/905,575, filed on Nov. 18, 2013.

(51) Int. Cl.
*G06K 9/00* (2006.01)
*G06T 15/20* (2011.01)
*G06T 7/246* (2017.01)
*G06T 7/73* (2017.01)
*G06K 9/62* (2006.01)

(52) U.S. Cl.
CPC ............... *G06T 7/251* (2017.01); *G06T 7/75* (2017.01); *G06T 15/20* (2013.01)

(56) References Cited

U.S. PATENT DOCUMENTS

| | | | |
|---|---|---|---|
| 6,954,212 B2 | 10/2005 | Lyons et al. | |
| 6,975,326 B2 | 12/2005 | Baumberg et al. | |
| 7,161,606 B2 * | 1/2007 | Gonzalez-Banos | G06T 3/0068 345/427 |
| 7,212,664 B2 | 5/2007 | Lee et al. | |
| 7,257,237 B1 | 8/2007 | Luck et al. | |
| 7,612,800 B2 | 11/2009 | Okada et al. | |
| 7,728,848 B2 | 6/2010 | Petrov et al. | |
| 7,808,502 B2 * | 10/2010 | Berger | G06T 15/20 345/427 |
| 8,107,721 B2 | 1/2012 | Beardsley et al. | |
| 8,126,260 B2 | 2/2012 | Wallack et al. | |
| 8,265,374 B2 * | 9/2012 | Kondo | G06T 15/20 345/421 |
| 8,508,550 B1 * | 8/2013 | Jenny | G06T 11/60 345/419 |
| 8,514,240 B2 | 8/2013 | Suzuki et al. | |
| 8,615,111 B2 * | 12/2013 | Garten | G06T 5/005 382/107 |
| 8,711,206 B2 | 4/2014 | Newcombe et al. | |
| 8,897,539 B2 | 11/2014 | Stone et al. | |
| 9,183,654 B2 * | 11/2015 | Geggie | G06T 15/506 |
| 9,317,973 B2 | 4/2016 | Choukroun | |
| 9,355,123 B2 | 5/2016 | Wnuk et al. | |
| 9,405,122 B2 | 8/2016 | Wu et al. | |
| 9,460,366 B2 | 10/2016 | Wnuk et al. | |
| 9,489,765 B2 | 11/2016 | Siddiqui | |
| 9,728,012 B2 | 8/2017 | Siiddiqui | |
| 2002/0114316 A1 | 8/2002 | Buchanan, Jr. et al. | |
| 2004/0095357 A1 * | 5/2004 | Oh | G06T 15/205 345/589 |
| 2005/0104879 A1 | 5/2005 | Kaye et al. | |
| 2006/0232583 A1 | 10/2006 | Petrov et al. | |
| 2008/0143724 A1 | 6/2008 | Russakoff | |
| 2010/0315413 A1 * | 12/2010 | Izadi | G06F 3/017 345/419 |
| 2011/0007072 A1 | 1/2011 | Khan et al. | |
| 2012/0094754 A1 | 4/2012 | Suzuki et al. | |
| 2012/0122491 A1 | 5/2012 | Kim et al. | |
| 2012/0154557 A1 * | 6/2012 | Perez | H04N 21/25891 348/53 |
| 2012/0317607 A1 | 12/2012 | Wyatt et al. | |
| 2013/0034203 A1 | 2/2013 | Wang et al. | |
| 2013/0188042 A1 | 7/2013 | Brooksby et al. | |
| 2013/0335529 A1 | 12/2013 | Engedal | |
| 2015/0139535 A1 * | 5/2015 | Siddiqui | G06K 9/00208 382/154 |
| 2015/0301592 A1 | 10/2015 | Miller | |
| 2015/0325046 A1 * | 11/2015 | Meier | G06T 15/00 382/154 |
| 2016/0018212 A1 | 1/2016 | Rouh et al. | |

OTHER PUBLICATIONS

Chen et al., "Silhouette-based Object Phenotype Recognition using 3D Shape Priors," 2011 IEEE International Conference on Computer Vision (ICCV), 10 pages.

McWhertor, "DreamPlay app a new leap in AR, not part of Disney Infinity project, say creators," www.polygon.com/2013/1/9/38519741disney-drearnplay-ar-app-disney-infinity, Jan. 9, 2013, 3 pages.

Brown et al. "Automatic Panoramic Image Stitching Using Invariant Features," International Journal of Computer Vision, vol. 74, Issue 1, Aug. 2007, 11 pages.

* cited by examiner

SILHOUETTE-BASED OBJECT AND TEXTURE ALIGNMENT, SYSTEMS AND METHODS

This application is a continuation of U.S. application Ser. No. 15/285,389, filed Oct. 4, 2016, which is a continuation of Ser. No. 14/546,873, filed Nov. 18, 2014, now U.S. Pat. No. 9,489,765; and claims priority to U.S. provisional application 61/905,575, filed Nov. 18, 2013. These and all other extrinsic materials discussed herein are hereby incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is object recognition technology.

BACKGROUND

The following description includes information that may be useful in understanding the present invention. It is not an admission that any of the information provided herein is prior art or relevant to the presently claimed invention, or that any publication specifically or implicitly referenced is prior art.

Consumers continue to experience an increasingly blurred distinction between real-world and on-line interactions. With the advent of object recognition technologies available today, consumers can now virtually interact with real-world objects through their smart phones. For example, consumers can capture an image of a movie poster via their cell phones. In response, the cell phone can construct an augmented reality interaction or game overlaid on the display of the cell phone. In fact, the Applicant has pioneered such technologies through their iD® technologies as implemented by DreamPlay™ (see URL www.polygon.com/2013/1/9/3851974/disney-dreamplay-ar-app-disney-infinity). Other technologies that attempt to offer similar experiences include the following:

Layar® (see URL www.layar.com),
Qualcomm Vuforia™ (see URL www.qualcomm.com/solutions/augmented-reality)
BlippAR.com™ (see URL www.blippar.com), and
13th Lab (see URL www.13thlab.com).

Unfortunately, such technologies are limited in scope and typically are only capable of recognizing a single object at a time (e.g., a single toy, a single person, a single graphic image, etc.). In addition, a consumer must position their cell phone into a correct position or orientation with respect to the object of interest, then wait for their cell phone to analyze the image information before engaging content is retrieved. Ideally a consumer should be able to engage content associated with an object of interest very quickly and should be able to engage many objects at the same time. The above referenced companies fail to provide such features.

Other efforts have been made in the field of object recognition. For example, in the publication "Silhouette-Based Object Phenotype Recognition Using 3D Shape Priors" by Chen et al., published in the 2011 IEEE International Conference on Computer Vision, Nov. 6-13, 2011, Chen states that there is a fundamental problem in recognizing three-dimensional (3D) objects from one or more two-dimensional (2D) views in computer vision. However, Chen takes a computationally intensive approach of generating large numbers of possible poses. Unfortunately, such implementations are not suitable for mobile handheld devices and merely attempt to view shape as an identifier. Chen points out numerous deficiencies with respect to recognizing 3D objects.

U.S. Pat. No. 6,858,826 "Method and Apparatus for Scanning Three-Dimensional Objects" issued to Mueller et al., filed Aug. 13, 2002, also recognizes the difficulty of recognizing 3D objects. Mueller specifically points out the difficulty of prior techniques that scan for 2D color information and separately scan for 3D information. Mueller rather uses a series of 2D color images to derive 3D points in space. However, such an approach fails to provide scale invariance when conducting recognition in handheld devices.

U.S. Pat. No. 6,954,212 "Three-Dimensional Computer Modeling" issued to Lyons et al., filed Nov. 5, 2002, describes building a 3D computer model of an object by aligning image data with silhouettes of computer generated model. Although Lyon discloses adequate building of 3D models, such modeling information is not practical for full 3D object recognition or tracking on resource-constrained devices.

U.S. Pat. No. 7,728,848 "Tools for 3D Mesh and Texture Manipulation" issued to Petrov et al., filed Mar. 28, 2001, teaches a method for editing three-dimensional computer models and textures that provides more precisely selected portions of the model for editing, allowing textures to be moved more easily on the model and allowing better blending of the appearance of adjacent textures.

U.S. Patent Publication 2006/0232583 "System and Method of Three-Dimensional Image Capture and Modeling" to Petrov et al., filed May 30, 2006, teaches a system for constructing a 3D model of an object based on a series of silhouette and texture map images.

U.S. Patent Publication 2011/0007072 "Systems and Methods for Three-Dimensionally Modeling Moving Objects" to Khan et al., filed Jul. 9, 2009, describes building a 3D model by first capturing images of an object from different viewpoints, identifying silhouettes of the object in each viewpoint, and then identifying the silhouette boundary pixels.

U.S. Patent Publication 2013/0188042 "System and Method for Object Measurement" to Brooksby, filed Mar. 12, 2013, describes building a model of an object by combining 2D images with a 3D CAD model. The objects are built by linking images with point correspondences from model parameters.

U.S. Patent Publication 2008/0143724 "Method and Apparatus for Probabilistic Atlas Based on Shape Modeling Technique" to Russakoff, filed Dec. 19, 2006, describes generating shape models of breasts based on silhouettes. Control points are placed along the edges of a two-dimensional breast silhouette and are used for deformational image analysis during mammogram viewing by comparing the control points placed on a baseline breast silhouette and the control points placed on an updated breast silhouette.

However, none of the references mentioned above provides an accurate 3D object recognition technique that is not computationally intensive, allowing real-time tracking of recognized objects. Thus, there is still a need to improve upon conventional 3D object recognition techniques.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides apparatus, systems and methods of generating object-image alignment data for different 3D objects. Once generated, the object-image alignment data can be sent to an object recognition application for use in recognizing or tracking real-world objects. In some embodiments, the object recognition application is being run on a mobile device having an image capturing device for capturing images of real world objects. The object recognition application recognizes real-world objects in the images by comparing the images with the object-image alignment data.

In some embodiments the method of generating the object-image alignment data includes a step of obtaining a digital three-dimensional (3D) model of a 3D object. The method also includes a step of obtaining a set of two-dimensional (2D) images of the object from several image view points. The method includes a step of generating a silhouette of the object from the digital 3D model. The silhouette includes a collection of edge points associated with edges of the digital 3D model from a silhouette point of view.

The method also includes a step of registering at least one image from the set of 2D images with the silhouette based on image view point associated with the at least one image and the silhouette point of view. The method includes a step of deriving at least one descriptor from the at least one image, and compiling feature points corresponding to the at least one descriptor based on the at least one image and the 3D model. The feature points include at least one 2D location and at least one 3D location of the at least one descriptor within the model. The method includes the step of generating an object-image alignment packet by packaging the at least one image, the at least one descriptor, and the feature point.

The digital 3D model of the object can be obtained in different ways. In some embodiments, the digital 3D model of the object is obtained by laser scanning the object. In other embodiments, the digital 3D model can be obtained by obtaining CAD data representing the object. In yet some other embodiments, the digital 3D model can also be obtained by obtaining a game engine asset, such as unity3D® or OpenGL, that represents the object.

The set of 2D images of the object can be obtained in many different ways as well. In some embodiments, the set of 2D images includes image data captured via an optical sensor. The image data can include still image data or a frame from a video stream. The image data can also include video data and/or data related to the properties of the optical sensor that captured the image data.

In some embodiments, the collection of points of the silhouette includes 3D points within the 3D model. In some of these embodiments, the collection of points includes relative 3D coordinates to a camera point of view. In some embodiments, each feature point also includes a set of 3D coordinates relative to a camera point of view.

In some embodiments, registering at least one image from the set of 2D images with the silhouette requires aligning a portion of the image data of the object within the at least one image to at least some of the edge points. Specifically, aligning the image data means aligning edge pixels within the image data of the object to at least some of the edge points of the silhouette.

The at least one descriptor derived from the image can be an image descriptor selected from the following different types of image descriptors: a SIFT descriptor, a DAISY descriptor, a FREAK descriptor, a FAST descriptor, or other type of descriptor.

In some embodiments, the object-image alignment packet also includes a key frame packet. The object-image alignment packet can also include at least one of the following: a normal vector, an orientation, sensor metadata, and other key frame data.

After generating the object-image alignment packet, the method can also include a step of sending the object-image alignment packet to an electronic device (e.g., a mobile device) over a network.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
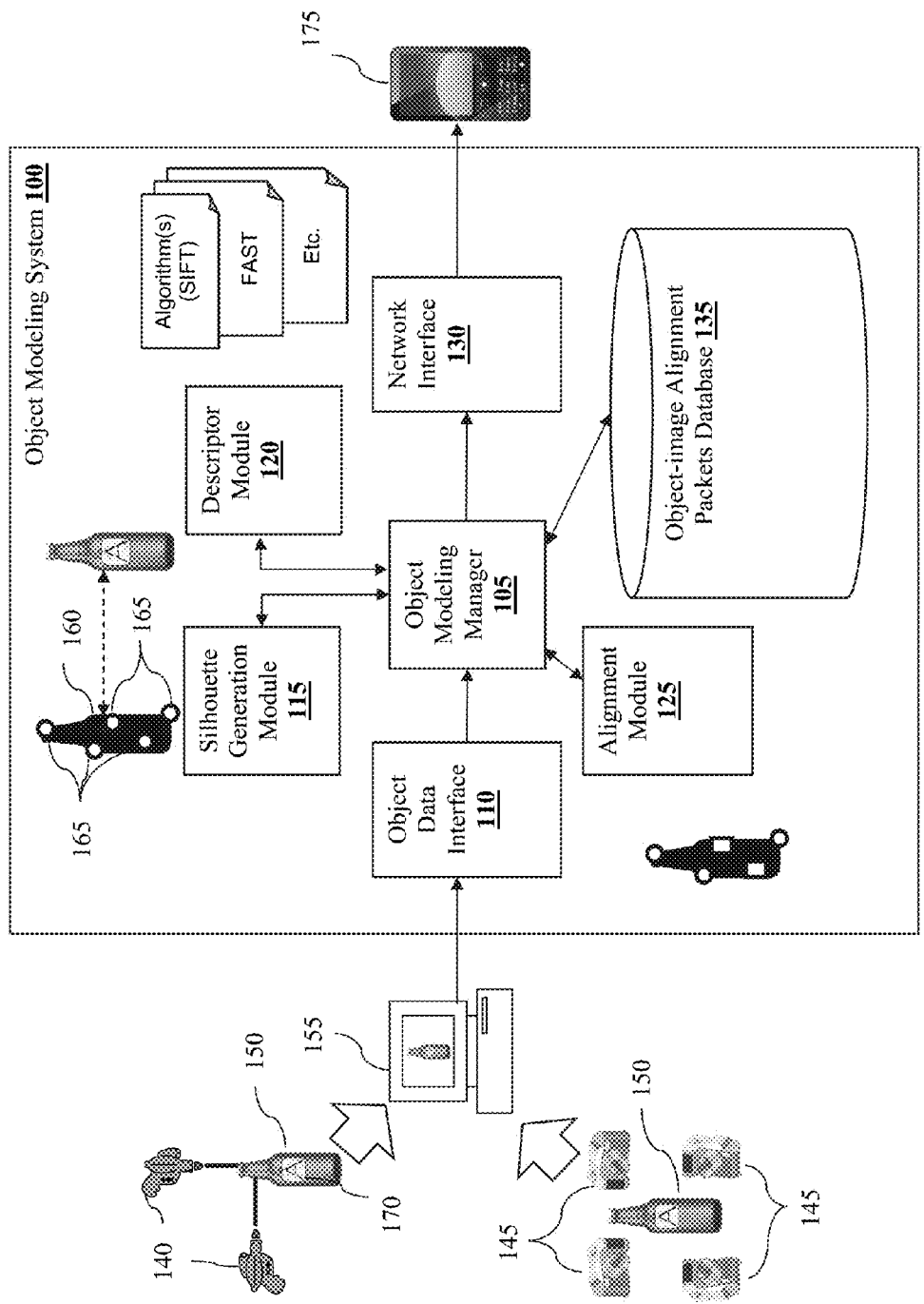
FIG. 1 illustrates an exemplary object modeling system of some embodiments.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

One should appreciate that the disclosed authentication system provides numerous advantageous technical effects.

The system enables computing devices to exchange digital tokens in the form of highly complex digital image descriptors derived from digital image data. The digital tokens are exchanged over a network as part of an authentication handshake function. If the computing device determines that the image descriptors satisfy authentication criteria, then the devices are considered authenticated. Thus, multiple computing devices are able to establish trusted communication channels among each other.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used in the description herein and throughout the claims that follow, when a system, engine, or a module is described as configured to perform a set of functions, the meaning of "configured to" or "programmed to" is defined as one or more processors being programmed by a set of software instructions to perform the set of functions.

The focus of the disclosed inventive subject matter is to enable construction or configuration of a computing device to operate on vast quantities of digital data, beyond the capabilities of a human. Although the digital data represents a real-world object, it should be appreciated that the digital data is a representation of one or more digital models of the real-world object, not the real-world object itself. By instantiation of such digital models in the memory of the computing devices, the computing devices are able to manage the digital data or models in a manner that could provide utility to a user of the computing device that the user would lack without such a tool.

The inventive subject matter provides apparatus, systems and methods of generating object-image alignment data for different 3D objects. Once the object-image alignment data is generated, the data can be sent to an object recognition application for use in recognizing or tracking real-world objects. In some embodiments, the object recognition application is being run on a mobile device having an image capturing device for capturing images of real-world objects. The object recognition application recognizes real-world objects in the images by comparing the images taken by the mobile device against the object-image alignment data.

FIG. 1 illustrates an example object modeling system 100 for generating such object-image alignment data. The modeling system 100 includes an object modeling manager 105, an object data interface 110, a silhouette generation module 115, a descriptor module 120, an alignment module 125, and a network interface 130. In some embodiments, the object modeling manager 105, the object data interface 110, the silhouette generation module 115, the descriptor module 120, the alignment module 125, and the network interface 130 are implemented as software modules that are executable by at least one processing unit (e.g., a processor, a processing core) of a computing device. In some embodiments, these different modules and interfaces can be implemented across multiple physical devices to form the object modeling system 100.

In some embodiments, the object modeling system 100 may be communicatively coupled with an object-image alignment packets database 135. The database 135 is a permanent data storage device that can be implemented on non-transitory devices such as a hard drive, a flash memory, etc. In some embodiments, the object-image alignment packets database 135 is implemented within the same computing device(s) having the object modeling system 100. In other embodiments, the object-image alignment packets database 135 may be communicatively coupled with the object modeling system 100 over a network (e.g., a Local Area Network (LAN), a Wide Area Network (WAN), the Internet, etc.).

As shown in FIG. 1, the object modeling system 100 can also be communicatively coupled with several other devices to receive object data. These devices are configured to capture data related to the appearance of real-world 3D objects and feeding the data to the object modeling system 100 via the object data interface 110. Examples of these data capturing devices can include a laser 3D scanner, a camera, a computing device running a computer-aided design (CAD) software.

Different data capturing devices provide different types of data for the object modeling system 100. For example, a laser 3D scanner 140 can capture data to generate a digital 3D model of the object representing the three-dimensional surface (i.e., the shape and contour) of the object. The digital 3D model includes coordinates information that when rendered by a computing device, can be expressed as a graphical representation of the object. In some embodiments, a laser 3D model includes a collection of points in a three-dimensional space, connected by various geometric entities such as triangles, polygons, lines, curved surfaces, edges or other entities to represent the 3D nature of the object. In order to capture this collection of "points", the object is first coated with a special material (e.g., paint, coatings, primers, etc.), and then undergo one or more laser scans to capture a set of coordinates in the 3D space. The coordinate data is passed to a 3D modeling software to generate a 3D model of the object. The 3D model can be rendered to be displayed on a display screen for users to view, and can also be compared with other 3D or 2D images for matching.

In some embodiments, CAD software can be used to assist in creating the 3D model of the object. In addition, the digital 3D model can also be built using a game engine asset such as Unity3D® or OpenGL.

As shown in FIG. 1, a set of lasers 140 are used to scan the body of an object 150, a bottle in this example, after coating a layer of non-reflective paint on the object 150. The data is fed into a computing device 155 running a CAD program. As shown, a rendered 3D presentation is shown on the display of the computing device 155 using data received from the 3D laser scan.

Image capturing devices such as cameras 145 can also be used to capture data of the 3D object. In some embodiments, multiple 2D images of the object can be captured by the camera 145 from different viewpoints (e.g., top view, bottom view, side view from different angles, etc.). Preferably, sufficient 2D images are captured such that the images collectively cover the entire surface area of the object, while minimizing cost. In some embodiments, the 2D texture of the object can be interpolated from a sparse number of images.

The 2D images can include still image data, a frame from a video stream, and/or video data. The images can also include data related to the properties of the optical sensor (e.g., focal length, distortion, compression scheme, etc.) when the images are captured.

As shown in FIG. 1, camera 145 is used to capture multiple 2D images of the object 150 from multiple viewpoints (e.g., positions, orientations, distance, perspectives, etc.). In some embodiments, the 2D images are uploaded to a computing device (such as computing device 155) before sending to the object modeling system 100.

After obtaining the 3D model and 2D images of the object (e.g., the object 150), the object modeling manager 105 of the object modeling system 100 uses different modules of the system 100 to process the model and images in order to produce the object-image alignment data for the object. The object-image alignment data can be stored in the database 135 and/or sent to an external device (such as mobile device 175) to be used for recognizing and tracking real-world objects.

In some embodiments, the object modeling system 100 takes the 3D model and generates multiple silhouettes of the object via the silhouette generation module 115. Each silhouette of a 3D object represents a geometry of the object without including any details as to the texture and color of the appearance of the object. In some embodiments, the silhouette produced by the silhouette generation module 115 comprises a collection of edge points that corresponds to the edges and contour of the three-dimensional geometry of the object. FIG. 1 illustrates an example silhouette 160 that the silhouette generation module 115 produced based on the 3D model of the object 150. As shown, the silhouette 160 includes multiple edge points 165 that outline the edges and contour of the object 150.

Each edge point includes a 3D point (can be represented by a set of coordinates in a 3D space) within the 3D model such that each edge point can be associated with a 3D location on the 3D model.

In addition, the multiple silhouettes of the object are generated by the silhouette generation module 115 based on different perspective viewpoints (e.g., top view, bottom view, side view from different angles). In some of these embodiments, each silhouette is generated based on a perspective viewpoint that corresponds to a particular camera viewpoint from which a 2D image of the object is captured.

The object modeling manager 105 on some embodiments then sends the silhouettes produced by the silhouette generation module 115 and the 2D images of the object to the alignment module 125. In some embodiments, the alignment module 125 makes associations between each silhouette and each 2D image based on the viewpoints on which they are based and aligns each silhouette with the associated 2D image. For example, a top view silhouette of an object will be associated with a top view 2D image of the object, a bottom view silhouette of an object will be associated with a bottom view 2D image of the object, etc. In some embodiments, the size of the image and/or the silhouette has to be adjusted in order to produce a perfect alignment.

It is contemplated that the captured 2D images might not accurately portray the object that they represent due to different factors during the capturing of the images. In other words, the images might show a distorted version of the object. Some of the distortions are caused by the camera equipment being used to capture the images (e.g., optical distortion from a focal length of the lens, etc.). In some embodiments, the alignment module 125 performs a set of distortion elimination algorithms on the 2D images to eliminate some of the distortions with the images so that they can be better aligned with the silhouettes.

In other embodiments, instead of adjusting the 2D images, the alignment module 125 adjusts (e.g., distorts) the silhouettes to align with the 2D images.

In some embodiments, aligning a silhouette with a 2D image requires aligning edge pixels (pixels representing the edge of the object in the image) within the image to at least some of the edge points. The alignment of the silhouette and the associated 2D image allows one to correspond any point (i.e., location) on the 2D image to a 3D point (i.e., location) on the 3D model (and vice versa).

In some embodiments, the descriptor module 120 also derives at least one descriptor from the 2D images for the object. A descriptor comprises data that describes a recognizable and distinctive feature that appears on the surface of the object (e.g., a logo, a mark, a design, a pattern, facial feature, etc.). In our example, a descriptor for the object 150 can comprise data that describes a logo 170 (or a portion thereof) that appears on the surface of the object 150 or a color scheme on the exterior surface of the object 150. The descriptor can also represent anything else that can be used to distinguish the object from other objects.

First, the descriptor module 120 identifies distinctive features of the object, based on the 2D images. Different embodiments use different techniques to locate these distinctive features on the object. In some embodiments, the descriptor module 120 uses one or more feature extraction algorithms to identify the distinctive features. Some of the most common feature extraction algorithms that can be used to derive descriptors from 2D images include: scale-invariant feature transform (SIFT), DAISY, FAST BRISK, and others. These different techniques can be used to identify distinctive features such as faces, logos, marks, signs, patterns, etc. from the images. One should appreciate that more than one type of descriptor could be derived.

Once the distinctive features are identified, the descriptor module 120 generates a descriptor for each identified feature. In some embodiments, the descriptor includes at least one of the following types of descriptors: a SIFT descriptor, a DAISY descriptor, a FREAK descriptor, and a FAST descriptor.

In some embodiments, the descriptor module 120 performs additional pre-processes to the 2D images to prepare for the generation of the descriptors. Specifically, the descriptor module 120 of some embodiments removes the luminance dimension from each pixel of the image such that all pixels in the image are left with only hue information. Since most digital images are represented in a color space that does not include a luminance dimension (e.g., RGB color space, YCrCb color space, etc.), to perform this luminance removal, the descriptor module 120 first transform the representation of the image's pixel information from its native (original) color space to a color space that includes luminance as one of its dimensions (e.g., HSL or HSV color space). Once the image is represented in the new color space, the descriptor module 120 can easily remove luminance by ignoring (or taking away) the luminance value of each pixel.

One benefit from removing the luminance value in this process is that it eliminates the optical deltas of the appearance of the images created by having different lighting conditions when the images were captured. This ensures that the descriptors derived from two different images on the same object captured under different lighting conditions will be identical for matching purpose.

After removing the luminance dimension from the pixels, the descriptor module 120 can derive descriptors at different locations on the images. As mentioned above, the descriptor module 120 uses one or more of the feature extraction algorithms to determine locations where distinctive features exist on the object. For example, on the images of the object 150, the feature extraction algorithm can determine that the logo 170 is a distinct feature. Based on the resulting feature list, the descriptor module 120 will generate a descriptor for each of the feature.

To generate a descriptor, the descriptor module 120 of some embodiments first selects a target pixel at the location of the image where the distinctive feature exists and then generates a difference vector between the target pixel and each of several of its neighboring pixels in the image. In the given example, the descriptor module 120 can select a target pixel that composes the logo 170. The descriptor module 120 then identifies several other pixels that neighbor the target pixel. The neighboring pixels can include pixels that are directly adjacent to the target pixel or in close proximity of the target pixel. In some embodiments, the descriptor module 120 of some embodiments generates the difference vectors for the target pixels based on the differences in hue values between the target pixel and its neighboring pixels. Preferably, the descriptor module 120 generates at least three difference vectors for the target pixel, each based on the difference value between the target pixel and a different neighboring pixel. Even more preferably, the descriptor module 120 generates at least eight difference vectors for the target pixel. One should appreciate the forgoing description represents one possible technique for generating a descriptor.

In some of these embodiments, the descriptor module 120 further computes a composite vector using the multiple difference vectors generated for the target pixel. The composite vector for that target pixel becomes data that is part of the descriptor and can be used subsequently for comparing with other composite vectors in order to determine if an object that appears in a new image is identical to the target object. More details on how descriptors are derived from an image can be found in U.S. Pat. No. 6,711,293 issued to David G. Lowe, titled "Method and Apparatus for identifying Scale Invariant Features in an Image and Use of Same for Locating and Object in an Image," filed Mar. 6, 2000.

After generating the descriptors for the object based on the 2D images, the object modeling manager 105 sends the data to the alignment module 125 to compile a set of feature points that correspond to the descriptors for the object. Each feature point for a descriptor comprises location data that represents a location on a 2D image and a location on the 3D model of the descriptor. In the given example, the descriptor module 120 has generated a descriptor corresponding to the logo 170 using the above-described method. Thus, the alignment module 125 compiles at least a feature point for the logo descriptor. The feature point includes data that represents a location of the logo's target pixel on the 2D image, and also a location of the logo on the 3D model. In some embodiments, the alignment module 125 identifies the corresponding location on the 3D model based on the 3D silhouette that is aligned with the 2D image.

The object modeling manager 105 then packages the feature points, the descriptors, the 2D images, and optionally the 3D model of the object into an object-image alignment packet for the object. In some embodiments, the object modeling manager 105 stores the object-image alignment packet in the object-image alignment packets database 135. In other embodiments, the object modeling manager 105 also sends the object-image alignment packets to remote devices, such as mobile device 175 over a network (e.g., the Internet, a LAN, etc.).

Figure 2:
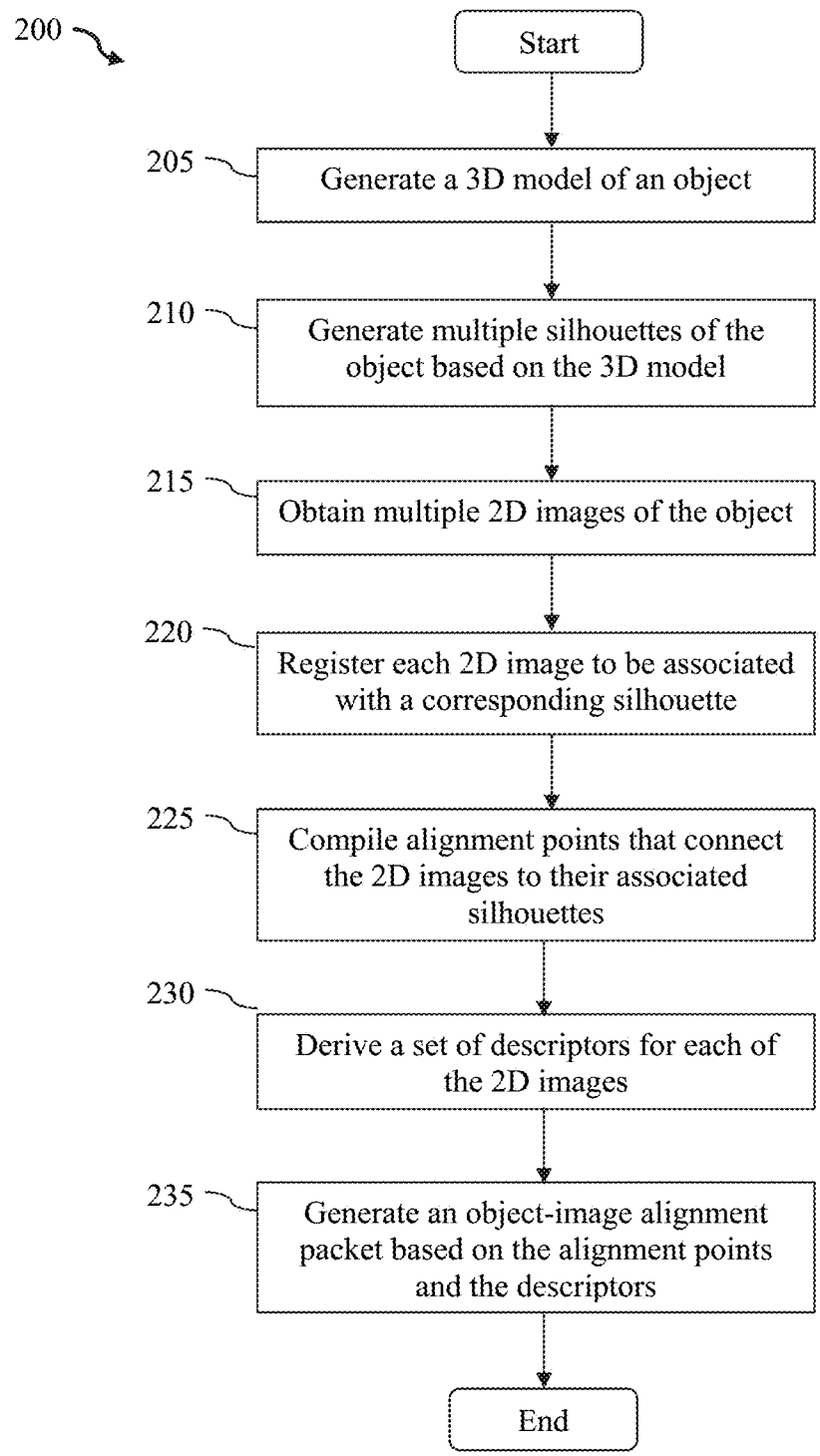
FIG. 2 is a flow chart of a process according to some embodiments of the inventive subject matter.

FIG. 2 illustrates a process 200 for generating object-image alignment data for object recognition according to some embodiments of the inventive subject matter. The process 200 will be described below by reference to FIGS.

3 and 4. The process 200 begins with generating (at step 205) a digital 3D model of a real-world object, such as a bottle or a suitcase. The process 200 then generates (at step 210) multiple silhouettes of the object based on the 3D model. As mentioned above, each of the multiple silhouettes of the object represents the shape of the object from a different perspective viewpoint. Preferably, the process 200 generates sufficient silhouettes to cover all perspective viewpoints of the object.

In addition to the 3D model and silhouettes, the process 200 also obtains (at step 215) multiple 2D images of the object. Similar to the silhouettes, each of the 2D images represents a different camera viewpoint of the object, dependent of the location of the camera capturing the object with respect to the object. The process 200 then registers (at step 220) each 2D image to be associated with a corresponding silhouette. Preferably, each associated pair of 2D image and silhouette share the same viewpoint of the object.

Figure 3:
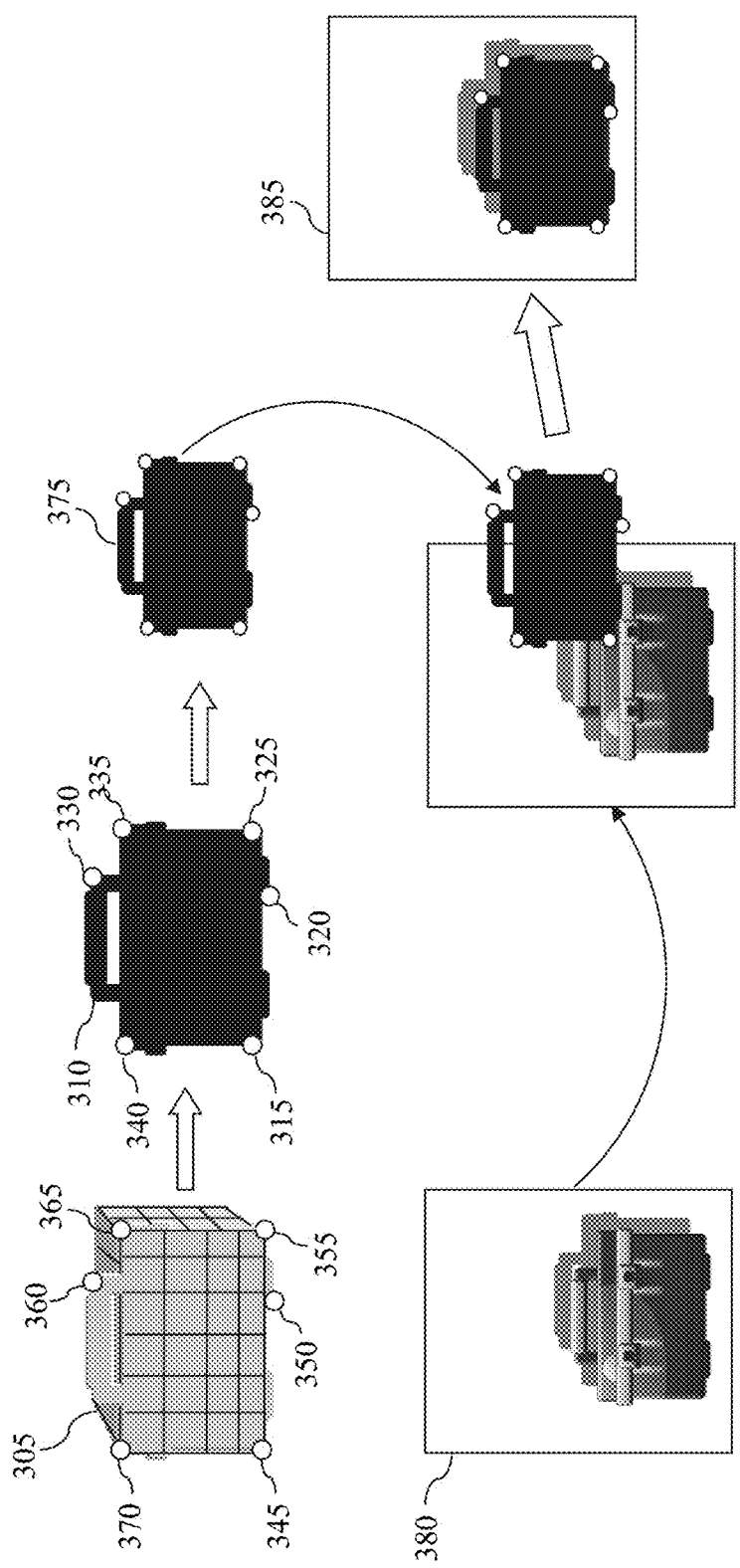
FIG. 3 illustrates how silhouettes are aligned with 2D images according to some embodiments of the inventive subject matter.

After pairing each 2D image with a silhouette, the process 200 compiles (at step 225) alignment points that connect the 2D images to their associated silhouettes. Referring to FIG. 3, a 3D model 305 of a suitcase has been generated using conventional methods (e.g., coating the suitcase with a non-reflective paint and using a laser scan to obtain the structure of the suitcase, etc.). As shown, the 3D model 305 includes different points, such as points 345-370, that represent a collection of points in a three-dimensional space connected by various geometric entities (shown as lines forming rectangles in this figure, but can also include other types of geometries).

Multiple silhouettes can be generated from the 3D model 305. In this example, a silhouette 310 of the 3D model 305 is generated based on a front perspective view of the suitcase 3D model 305. Although not shown in this figure, additional silhouettes that are based on other viewpoints of the 3D model 305 can also be generated from the 3D model 305 by the object modeling system 100. As shown, the silhouette 310 appears like a shadow as it represents only a geometry of the suitcase from a single viewpoint, and does not include any details as to the color and surface texture of the suitcase. The silhouette 310 also includes multiple edge points, such as edge points 315-340, that outline the edges and contour of the silhouette 310. It is noted that edge points 315-340 only represent a subset of possible edge points for silhouette 310. Preferably, the edge points for the silhouette 310 should outline all (or a majority portion) of the edges and contour of the silhouette 310.

Preferably, each of the generated edge points 315-340 corresponds to a 3D point on the 3D model 305, where the corresponding edge point and 3D point represent the same location of the real-world object. For example, edge point 315 corresponds to 3D point 345, edge point 320 corresponds to 3D point 350, edge point 325 corresponds to 3D point 355, edge point 330 corresponds to 3D point 360, edge point 335 corresponds to 3D point 365, and edge point 340 corresponds to 3D point 370. These corresponding edge points and 3D points enable one to identify a location on the 3D model 305 given a location on the silhouette.

In addition to the 3D model 305, FIG. 3 also illustrates that a 2D image 380 has been generated for the suitcase. In this example, the 2D image 380 represents a front perspective viewpoint of the suitcase. Preferably, multiple 2D images that represent different viewpoints of the suitcase are generated by the object modeling system 100. Once the 2D images are generated, the object modeling system 100 pairs each silhouette with a 2D image that shares the same or substantially similar viewpoints. In this example, silhouette 310 of the suitcase is paired (associated) with 2D image 380 because they represent the same object (the suitcase) from a similar (front) perspective viewpoint. Upon pairing each silhouette to its corresponding 2D image, the object modeling system 100 aligns each silhouette with its paired 2D image. As mentioned above, the silhouette and the associated 2D image might not align perfectly due to different sizing, distortions, etc. As such, some image processing might be performed on the silhouette, or the 2D image, or both in order to better align the two. As shown in this figure, the silhouette 310 is shrunk in size to become silhouette 375 so that it can be better aligned with the suitcase appear in the 2D image 380.

FIG. 3 illustrates that the shrunk silhouette 375 is perfectly aligned with the 2D image 380 in an alignment image 385. In some embodiments, the alignment process includes deriving alignment points. In some embodiments, an alignment point comprises an edge point of the silhouette and also an identification of a corresponding pixel in the 2D image. In this example, an alignment point can be generated for the edge point 315 on the silhouette 310 and includes a pixel on the 2D image 380 that represents the lower left corner of the suitcase. Similarly, an alignment point can be generated for the edge point 335 and includes a pixel on the 2D image 380 that represents the upper right corner of the suitcase. Because of the associations between edge points on the silhouette 310 and locations on the 3D model 305, the alignment points allow one to associate any pixel on the 2D image 380 to a location on the 3D model 305 (e.g., by calculating the distance (vector) between the pixel on the 2D image to the different pixels that have been associated with the edge points on the silhouette 310.

Figure 4:
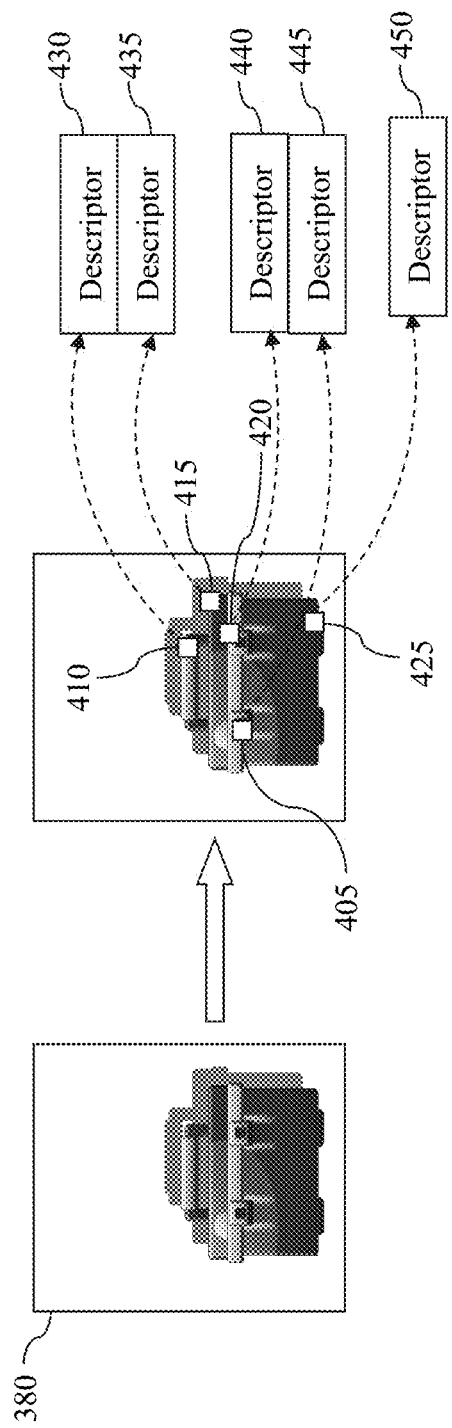
FIG. 4 illustrates how descriptors are derived from a 2D image according to some embodiments of the inventive subject matter.

Referring back to FIG. 2, after compiling the alignment points, the process 200 derives (at step 230) a set of descriptors for each of the 2D images. FIG. 4 illustrates a set of descriptors being generated from the 2D image 380 of the suitcase. To generate the descriptors, the object modeling system is programmed to first identify a set of features (e.g., local features, global features, a combination of both local and global features, etc.) on the 2D image 380. In one example, the object modeling system 100 can use an image recognition algorithm such as scale-invariant feature transform (SIFT; see U.S. Pat. No. 6,711,293 titled "Method and apparatus for identifying scale invariant features in an image and use of same for locating an object in an image" filed Mar. 6, 2000) to detect and describe local features (as descriptors) in images.

The identified features can include an area of the image 380 around the edges and/or corners of a detected object within the image 380. For example, the image 380 of the suitcase can have a descriptor that describes a part of the handle on the suitcase, a part of the buckle, a part of the belt, a part of the "legs", etc. In this example, the object modeling system 100 has identified five features 405-425 within the image 380 of the suitcase to form the descriptor set 430-450. Preferably, the five features 405-425 represent unique features of the captured suitcase. For each identified feature, the object modeling system 100 is programmed to derive a descriptor (e.g., SIFT descriptors, Histogram of Gradients, etc.). The descriptor essentially characterizes one or more aspects (e.g., color aspect, gradient aspect, contrast aspect, etc.) of the corresponding identified feature.

Referring back to FIG. 2, once a set of descriptors is generated for the 2D image, the process 200 then generates (at step 235) an object-image alignment packet based on the alignment points and the descriptors. As mentioned above, the object-image alignment packet includes each generated alignment point and its corresponding descriptor that describes the feature located at the alignment point.

The generated object-image alignment packet can give rise to many practical usages, including recognizing and tracking objects. For example, the object-image alignment packet is particularly advantageous when recognizing and/or tracking featureless objects, such as a logo. A logo is usually a two-dimensional image without much of a texture. As such, it is much easier to map a silhouette to an image of the logo.

In another example, once a recognized object is identified, the system can mask the image or video frame using the silhouette that has been aligned with the digital representation of the object (e.g., the image or the video frame), and superimpose (or overlay) a green screen on the remaining portion of the image/video frame. This enables virtual reality and augmented reality by easily taking the portion of the image that represents the object out of the image/video frame and put it in another digital media.

In another use case, the silhouettes associated with an object can be used as the basis for recognizing and tracking strategy. For example, once the object is recognized in an image or a video frame, the system can use the associated silhouette of the object (e.g., by overlaying the silhouette on top of the digital representation of the object in the image/video frame) to determine if there is movement of the object from frame to frame. In some of these embodiments, even micro motion of the object can be detected using the silhouette, which conventional object recognition/tracking technology could not do.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification refers to at least one of something selected from the group consisting of A, B, C . . . and N, the text should be interpreted as requiring only one element from the group, not A plus N, or B plus N, etc.

What is claimed is:

1. An electronic device for presenting augmented reality media, the device comprising:
    a tangible, non-transitory, computer-readable memory configured to store at least one object-image alignment packet associated with at least one scanned body of an object, wherein the at least one object-image alignment packet comprises alignment points that include recognition descriptors, feature points, and silhouettes, and wherein the recognition descriptors correspond to feature points located on the silhouettes and on one or more corresponding images of the at least one scanned body;
    at least one processor coupled with the tangible, non-transitory computer-readable memory and, upon execution of object recognition and tracking software instructions, is configured to operate to:
        recognize at least one portion of a body in a digital representation as the at least one scanned body based at least in part on the recognition descriptors;
        track the at least one portion of the body in the digital representation based on the recognition descriptors;
        align, based on the feature points, at least one of the silhouettes corresponding to the at least one scanned body with the at least one portion of the body in the digital representation; and
        display digital media in the digital representation according to the at least one of the silhouettes.

2. The device of claim 1, wherein the at least one scanned body comprises a 3D object model.

3. The device of claim 1, wherein the digital representation comprises at least one of an image, a video, and a video frame.

4. The device of claim 1, wherein the at least one processor is further configured to facilitate capturing the digital representation.

5. The device of claim 1, wherein the at least one processor is further configured to:
    overlay the at least one portion of the body in the digital representation with the at least one of the silhouettes;
    determine a movement of the at least one portion of the body in the digital representation according to the at least one of the silhouettes; and
    display the digital media based at least in part on the movement.

6. The device of claim 5, wherein the movement of the at least one portion of the body is determined based on a single image or video frame of the digital representation.

7. The device of claim 5, wherein the movement of the at least one portion of the body is determined based on the digital representation from frame to frame.

8. The device of claim 5, wherein the movement of the at least one portion of the body is determined based on a detected micron motion.

9. The device of claim 1, wherein the digital media is displayed as one of an overlay or superposition.

10. The device of claim 1, wherein the at least one portion of the body comprises a view of the body.

11. The device of claim 1, wherein the recognition descriptors include at least one of a SIFT descriptor, a DAISY descriptor, a FREAK descriptor, a histogram of gradients descriptor, and a FAST descriptor.

12. The device of claim 1, wherein the electronic device comprises a mobile device.

13. The device of claim 1, wherein the digital media comprises green screen media.

14. The device of claim 1, wherein displaying the digital media includes overlaying the digital media on a portion of the digital representation that remains unmasked by the at least one of the silhouettes.

15. The device of claim 1, wherein each feature point includes a 2D location within the one or more corresponding images of the at least one scanned body and a 3D location on the at least one scanned body.

16. The device of claim 1, wherein the silhouettes represent different points of view of the at least one scanned body.

17. The device of claim 16, wherein the silhouettes represent views of the at least one scanned body from different angles.

18. The device of claim 1, wherein the at least one object-image alignment packet includes at least one of a normal vector, an orientation, and sensor metadata.

19. The device of claim 1, wherein the aligning includes at least one of adjusting a size of the at least one of the silhouettes and distorting the at least one of the silhouettes.

20. The device of claim 1, wherein the recognition descriptors comprise a facial feature or pattern.

21. The device of claim 1, wherein the at least one portion of body comprises a face.

22. The device of claim 1, wherein the at least one of the silhouettes corresponding to the at least one scanned body are used as a basis for a recognition and tracking strategy.

* * * * *